United States Patent
Urien et al.

(10) Patent No.: US 10,876,736 B2
(45) Date of Patent: Dec. 29, 2020

(54) GLASS USED AS A COMPONENT OF A HEATING DEVICE

(71) Applicant: SAINT-GOBAIN GLASS FRANCE, Courbevoie (FR)

(72) Inventors: Mathieu Urien, Fontenay sous Bois (FR); Benoit Illy, San Diego, CA (US); Alexandre Maillet, Compiegne (FR); Matthias Alschinger, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 184 days.

(21) Appl. No.: 15/536,481

(22) PCT Filed: Dec. 14, 2015

(86) PCT No.: PCT/FR2015/053476
§ 371 (c)(1),
(2) Date: Jun. 15, 2017

(87) PCT Pub. No.: WO2016/097560
PCT Pub. Date: Jun. 23, 2016

(65) Prior Publication Data
US 2018/0003394 A1 Jan. 4, 2018

(30) Foreign Application Priority Data

Dec. 19, 2014 (FR) .................................. 14 62875

(51) Int. Cl.
*C03C 17/36* (2006.01)
*F24C 15/04* (2006.01)
*F24C 15/10* (2006.01)

(52) U.S. Cl.
CPC ............. *F24C 15/04* (2013.01); *C03C 17/36* (2013.01); *C03C 17/3626* (2013.01); *C03C 17/3644* (2013.01); *C03C 17/3681* (2013.01); *C03C 17/3686* (2013.01); *F24C 15/10* (2013.01); *C03C 2217/78* (2013.01); *C03C 2217/944* (2013.01); *C03C 2217/948* (2013.01)

(58) Field of Classification Search
USPC .................... 428/426, 428, 432, 434, 688
See application file for complete search history.

(56) References Cited

U.S. PATENT DOCUMENTS

| | | | |
|---|---|---|---|
| 6,060,178 | A | 5/2000 | Krisko |
| 6,231,999 | B1 | 5/2001 | Krisko |

(Continued)

FOREIGN PATENT DOCUMENTS

| | | |
|---|---|---|
| WO | WO 2009/115596 A1 | 9/2009 |
| WO | WO 2014/125083 A1 | 8/2014 |
| WO | WO 2014/191474 A2 | 12/2014 |

OTHER PUBLICATIONS

International Search Report dated Mar. 14, 2016 in PCT/FR2015/053476, filed Dec. 14, 2015.

*Primary Examiner* — Lauren R Colgan
(74) *Attorney, Agent, or Firm* — Oblon, McClelland, Maier & Neustadt, L.L.P.

(57) ABSTRACT

A glazing can be used as a constituent element of a heating device or of a fireproof door. The glazing includes a transparent substrate coated with a stack of thin layers including at least one silver-based functional metal layer and an upper protective layer based on zirconium titanium oxide.

16 Claims, 1 Drawing Sheet

(56) References Cited

U.S. PATENT DOCUMENTS

Figure 1:
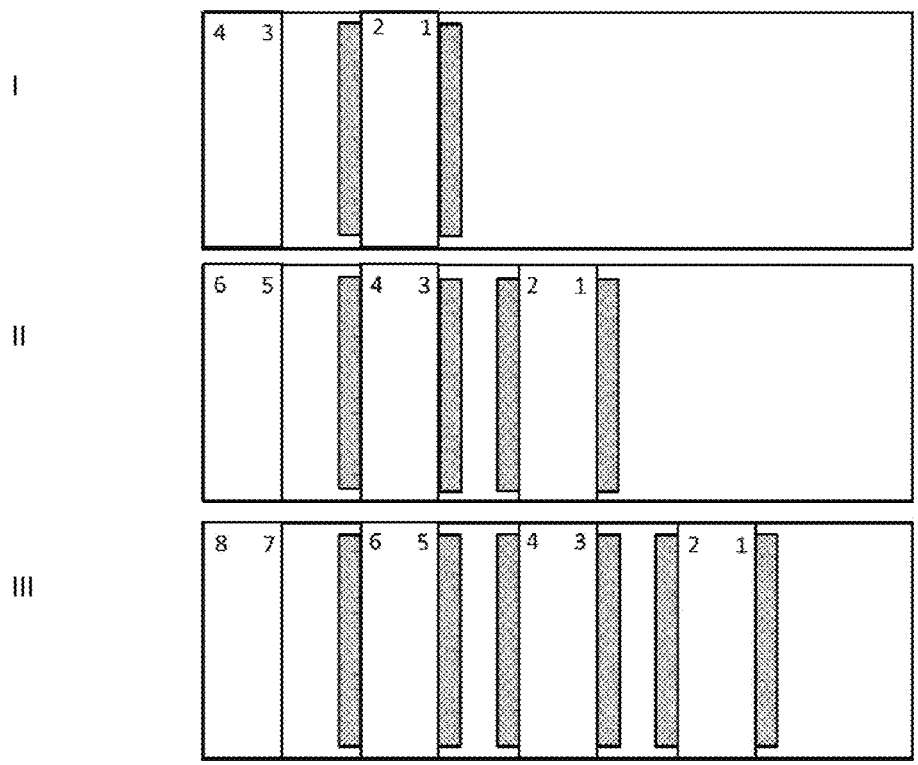

| | | | |
|---|---|---|---|
| 8,097,342 B2* | 1/2012 | Thomsen | C03C 17/3602 126/19 R |
| 2011/0008641 A1* | 1/2011 | Di Stefano | C03C 17/36 428/552 |
| 2016/0023942 A1 | 1/2016 | Mahieu | |
| 2016/0031751 A1* | 2/2016 | Mahieu | C03C 17/3618 428/623 |

* cited by examiner

GLASS USED AS A COMPONENT OF A HEATING DEVICE

The invention relates to a glazing used as constituent element of a heating device comprising a transparent substrate coated with a stack of thin layers comprising at least one silver-based functional metal layer.

A heating device comprises a chamber delimited by one or more walls and heating means, such as to make possible the heating of the chamber to a high temperature. Heating devices can in particular be chosen from ovens, fireplaces, furnaces, and the like. According to the invention, the heating means are distinct from the stack of thin layers. Heated motor vehicle glazings, the stack of which acts as heating element, do not correspond to a heating device according to the invention.

The glazings used as constituent elements of a heating device are generally multiple glazings, in particular triple glazings. Multiple glazings contribute to holding the heat inside the heating device while keeping the external surface of the glazing cold to the touch for the protection of the users.

A multiple glazing comprises at least two substrates held at a distance so as to delimit a space. The faces of the glazing are denoted starting from the inside of the heating device and by numbering the faces of the substrates from the inside towards the outside of the heating device.

The glazings used as constituent elements of a heating device also comprise substrates coated with functional coatings which reflect infrared (IR) radiation. These coatings make it possible to reduce the amount of energy dissipated toward the outside of the heating device by reflecting the heat toward the chamber. The use of these coatings contributes to reducing the consumption of the heating device and the heating of the glazing.

The coatings comprising silver-based functional metal layers (or silver layers) are the most effective in reducing the emissivity of glazings while retaining the optical and esthetic qualities. These coatings provide better protection to the users, a lower energy consumption and a greater comfort of use.

However, the chemical resistance, thermal resistance and mechanical strength of the coatings comprising these silver-based functional metal layers is often insufficient. This weak resistance/strength is reflected during use under normal conditions, that is to say at temperatures of less than 100° C., by the appearance in the short term of defects, such as sites of corrosion, scratches, indeed even the total or partial tearing of the stack.

This phenomenon is accentuated when these glazings are used in heating devices, for example as oven doors, subjected to long and repeated heat treatment cycles at elevated temperatures in a humid environment. These heat treatment cycles accelerate even more the degradation of the silver layers, in particular by dewetting or corrosion of the silver.

All defects or scratches, whether due to corrosion or to mechanical stresses, are liable to detrimentally affect not only the energy and optical performances but also the attractiveness of the coated substrate.

The low resistance of the silver-based stacks to chemical attacks and to mechanical stresses during cleaning by the user limits their use as glazing in heating devices. This is because foodstuffs, cleaning products and mechanical cleaning means, such as rubbing with a rag, a sponge or a brush, can damage the stack, indeed even bring about complete or partial tearing of the stack.

The application US 2012/0084963 discloses a multiple glazing used as a constituent element of an oven door comprising a transparent substrate coated with a stack of thin layers comprising at least one silver-based functional metal layer and an upper protective layer based on zirconium oxide.

The layers based on zirconium oxide protect the stack during a high-temperature heat treatment. However, the substrates coated with such protective layers are subject to corrosion in a humid environment under hot conditions. The use of layers of zirconium oxide does not make it possible to sufficiently improve the thermal resistance, chemical resistance and mechanical strength.

There exists a need to develop novel stacks which are resistant simultaneously to repeated high-temperature heat treatments but also to corrosion under hot conditions in a humid environment and to cleaning.

The applicant has discovered, surprisingly, that the use as upper protective layer of a layer of zirconium titanium oxide makes it possible to achieve these objectives by considerably improving the resistance to corrosion under hot conditions while retaining a good resistance to chemical attacks or to mechanical stresses.

The invention relates to a heating device provided with a chamber delimited by one or more walls, at least one wall of which comprises at least one glazing comprising a transparent substrate coated with a stack of thin layers comprising at least one silver-based functional metal layer, characterized in that the stack comprises an upper protective layer based on zirconium titanium oxide.

The glazing of the invention is suitable in all applications requiring the use of a stack comprising silver layers for which the resistance to repeated heat treatments and to corrosion in a humid environment under hot conditions are key parameters. Mention may in particular be made of:
  glazings for oven doors, which may or may not be pyrolytic,
  glazings for fireplace insert doors,
  glazings for fireproof doors,
  glazings for heating elements, such as radiators and towel rails.

The invention also relates to the use of a glazing as constituent element of a heating device or of a fireproof door, the glazing comprising a transparent substrate coated with a stack of thin layers comprising at least one silver-based functional metal layer, characterized in that the stack comprises an upper protective layer based on zirconium titanium oxide.

The glazing is preferably chosen from multiple glazings comprising at least two transparent substrates.

The upper protective layer based on zirconium titanium oxide exhibits, by order of increasing preference, a ratio by weight of titanium to zirconium Ti/Zr of between 60/40 and 90/10, between 60/40 and 80/20, between 60/40 and 70/30, between 60/40 and 65/35 or between 60/40 and 64/36.

The upper protective layer based on zirconium titanium oxide exhibits, by order of increasing preference, an atomic ratio of titanium to zirconium Ti/Zr of between 2.0 and 4.0, preferably 2.5 and 3.5.

The layers of zirconium titanium oxide can be deposited from a $TiZrO_x$ ceramic target. The ratio of titanium to zirconium Ti/Zr in the layer is virtually equivalent to that of the target.

The ceramic targets can optionally comprise other elements, which are reencountered in the layers deposited from these targets.

The upper protective layer is preferably the final layer of the stack, that is to say the layer which is furthest from the substrate coated with the stack.

The upper protective layer has a thickness:
of less than or equal to 15 nm, of less than or equal to 12 nm or of less than or equal to 10 nm, and/or
of greater than or equal to 1 nm, of greater than or equal to 2 nm or of greater than or equal to 5 nm.

The glazing according to the invention can comprise at least one transparent substrate coated with several stacks of thin layers comprising at least one silver-based functional metal layer and/or functional coatings, in particular a stack or coating on each of its faces.

The silver layers are deposited between dielectric coatings which generally comprise several dielectric layers making it possible to adjust the optical properties of the stack. In addition, these dielectric layers make it possible to protect the silver layer from chemical or mechanical attacks. The stack of thin layers thus advantageously comprises at least one silver-based functional metal layer and at least two dielectric coatings, each dielectric coating comprising at least one dielectric layer, so that each functional metal layer is deposited between two dielectric coatings.

Preferably, the stack of thin layers comprises just one functional layer.

The stack of thin layers comprises one or more layers of oxides. However, according to an advantageous embodiment, the total thickness of all the layers of oxides present in the stack is less than 10 nm, preferably less than 5 nm. A stack according to the invention exhibiting this characteristic exhibits the best results in terms of resistance to repeated heat treatments at high temperatures.

The stack is deposited by cathode sputtering, in particular assisted by a magnetic field (magnetron process). According to this advantageous embodiment, all the layers of the stack are deposited by magnetic field-assisted cathode sputtering.

Unless otherwise mentioned, the thicknesses alluded to in the present document are physical thicknesses. Thin layer is understood to mean a layer exhibiting a thickness of between 0.1 nm and 100 micrometers.

Throughout the description, the substrate according to the invention is regarded as being positioned horizontally. The stack of thin layers is deposited above the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one or more layers inserted between these two layers.

The silver-based functional metal layer comprises at least 95.0%, preferably at least 96.5% and better still at least 98.0% by weight of silver, with respect to the weight of the functional layer. Preferably, the silver-based functional metal layer comprises less than 1.0% by weight of metals other than silver, with respect to the weight of the silver-based functional metal layer.

The thickness of the silver-based functional layers is, by order of increasing preference, from 5 to 20 nm, from 8 to 15 nm.

The stack can comprise at least one blocking layer, the function of which is to protect the silver layers by preventing possible degradation related to the deposition of a dielectric coating or related to a heat treatment. These blocking layers are preferably located in contact with the silver-based functional metal layers.

The stack can comprise at least one blocking layer located below and in contact with a silver-based functional metal layer and/or at least one blocking layer located above and in contact with a silver-based functional metal layer.

Mention may be made, among the blocking layers conventionally used, of blocking layers based on a metal chosen from niobium Nb, tantalum Ta, titanium Ti, chromium Cr or nickel Ni or based on an alloy obtained from at least two of these metals, in particular on an alloy of nickel and chromium (NiCr).

The thickness of each blocking overlayer or underlayer is preferably:
at least 0.2 nm or at least 0.5 nm and/or
at most 5.0 nm or at most 2.0 nm.

The dielectric coatings exhibits a thickness of greater than 15 nm, preferably of between 15 and 50 nm and better still from 30 to 40 nm.

The dielectric layers of the dielectric coatings exhibit the following characteristics, alone or in combination:
they are deposited by magnetic field-assisted cathode sputtering,
they are chosen from dielectric layers having a barrier function,
they are chosen from dielectric layers having a stabilizing function,
they are chosen from oxides or nitrides or one or more elements chosen from titanium, silicon, aluminum, tin and zinc,
they have a thickness of greater than 5 nm, preferably of between 8 and 50 nm and better still from 10 to 35 nm.

Dielectric layers having a barrier function is understood to mean a layer made of a material capable of forming a barrier to the diffusion of oxygen and water at high temperature, originating from the ambient atmosphere or from the transparent substrate, toward the functional layer. The dielectric layers having a barrier function can be based on silicon and/or aluminum compounds chosen from oxides, such as $SiO_2$, nitrides, such as silicon nitrides $Si_3N_4$ and aluminum nitrides AlN, and oxynitrides $SiO_xN_y$, optionally doped using at least one other element. The dielectric layers having a barrier function can also be based on zinc tin oxide.

Dielectric layers having a stabilizing function is understood to mean a layer made of a material capable of stabilizing the interface between the functional layer and this layer. The dielectric layers having a stabilizing function are preferably based on crystalline oxide, in particular based on zinc oxide, optionally doped using at least one other element, such as aluminum. The dielectric layer or layers having a stabilizing function are preferably layers of zinc oxide.

The dielectric layer or layers having a stabilizing function can be found above and/or below at least one silver-based functional metal layer or each silver-based functional metal layer, either directly in contact with it or separated by a blocking layer.

According to an advantageous embodiment, the dielectric layer based on silicon and/or aluminum nitride is preferably in contact with the upper protective layer based on zirconium titanium oxide. The dielectric layer based on silicon and/or aluminum nitride has a thickness:
of less than or equal to 100 nm, of less than or equal to 50 nm or of less than or equal to 40 nm, and/or
of greater than or equal to 15 nm, of greater than or equal to 20 nm or of greater than or equal to 25 nm.

According to an embodiment, the stack comprises:
a dielectric coating located below the silver-based functional metal layer,
optionally a blocking layer,
a silver-based functional metal layer,
optionally a blocking layer,
a dielectric coating located above the silver-based functional metal layer,
an upper protective layer.

According to one embodiment, the stack comprises:
a dielectric coating located below the silver-based functional metal layer comprising at least one dielectric layer based on silicon and/or aluminum nitride and optionally a dielectric layer having a stabilizing function based on zinc oxide,
optionally a blocking layer,
a silver-based functional metal layer,
optionally a blocking layer,
a dielectric coating located above the silver-based functional metal layer comprising at least one dielectric layer based on silicon and/or aluminum nitride,
an upper protective layer.

The transparent substrates according to the invention are preferably made of a rigid inorganic material, such as made of glass, in particular soda-lime-silica, borosilicate or aluminosilicate glass or glass-ceramic. According to an advantageous embodiment, the substrates are borosilicate glasses which withstand very high temperatures well.

The thickness of the substrate generally varies between 0.5 mm and 19 mm. The thickness of the substrate is preferably less than or equal to 6 mm, indeed even 4 mm.

The transparent substrate coated with the stack may have to undergo a high-temperature heat treatment chosen from an annealing, for example a flash annealing, such as a laser or flame annealing, a tempering and/or a bending. The temperature of the heat treatment is greater than 400° C., preferably greater than 450° C. and better still greater than 500° C. The substrate coated with the stack can thus be bent and/or tempered.

The substrate coated with the stack is preferably a tempered glass, in particular when it forms part of a glazing used in as constituent element of a heating device or of a fireproof door.

The glazing is preferably a multiple glazing comprising two, three or four substrates.

A double glazing comprises two substrates, an external substrate and an internal substrate, and 4 faces. The face 1 is inside the heating device and thus constitutes the internal wall of the glazing. The faces 2 and 3 are inside the double glazing. The face 4 is outside the heating device and thus constitutes the external wall of the glazing.

A triple glazing comprises three substrates, an external substrate, a central substrate and an internal substrate, and 6 faces. The face 1 is inside the heating device and thus constitutes the internal wall of the glazing. The faces 2 to 5 are inside the triple glazing. The face 6 is outside the heating device and thus constitutes the external wall of the glazing.

The glazing according to the invention can comprise at least one, at least two or at least three transparent substrates coated with a stack of thin layers comprising at least one silver-based functional metal layer.

The glazing can comprise at least one transparent substrate coated with a functional coating other than a stack of thin layers comprising at least one silver-based functional metal layer, such as a coating comprising a transparent conductive oxide (TCO), such as, for example, a material based on indium tin oxide (ITO) or based on zinc oxide doped with aluminum (ZnO:Al) or doped with boron (ZnO:B) or also based on tin oxide doped with fluorine ($SnO2:F$). These materials are deposited by a chemical route, such as, for example, by chemical vapor deposition (CVD), optionally enhanced by plasma (PECVD), or by a physical route, such as, for example, by deposition under vacuum by cathode sputtering, optionally assisted by magnetic field (Magnetron).

FIG. 1 illustrates three examples of heating devices comprising multiple glazings according to the invention, a double glazing (I), a triple glazing (II) and a glazing comprising 4 substrates (III). The parts in grey represent the different positions where the stack of thin layers may be used.

The heating device makes possible the heating of the chamber to a high temperature, in particular of greater than 50, 100, 200, 300, 400, 500 or 600° C. In addition, the heating device comprises heating means. These heating means make possible the heating of the chamber to a high temperature, in particular of greater than 50, 100, 200, 300, 400, 500 or 600° C.

In a specific embodiment, the stack comprising a silver-based functional layer is positioned on the face of the substrate in contact with the chamber of the heating device.

EXAMPLES

Stacks of thin layers defined below are deposited on substrates made of clear soda-lime glass with a thickness of 4 mm.

For these examples, the conditions for deposition of the layers deposited by spluttering ("magnetron cathode" sputtering) are summarized in table 1 below.

The layers of zirconium titanium oxide are deposited from a $TiZrO_x$ ceramic target. The titanium to zirconium Ti/Zr ration in the target is 64:36 by weight, corresponding to 77:23 atomic. The ratio of titanium to zirconium Ti/Zr in the layer is a ratio equivalent to that of the target.

TABLE 1

| | Targets employed | Deposition pressure | Gases | Index* |
|---|---|---|---|---|
| $Si_3N_4$ under Ag | Si:Al (92:8% by wt) | $2-15*10^{-3}$ mbar | Ar: 30-60%-$N_2$: 40-70% | 2.00 |
| $Si_3N_4$ over Ag | Si:Al (92:8% by wt) | $2-15*10^{-3}$ mbar | Ar: 30-60%-$N_2$: 40-70% | 2.06 |
| NiCr | Ni:Cr (80:20% at.) | $1-5*10^{-3}$ mbar | Ar at 100% | — |
| Ag | Ag | $2-3*10^{-3}$ mbar | Ar at 100% | — |
| $TiO_2$ | $TiO_x$ | $1.5*10^{-3}$ mbar | Ar 88%-$O_2$ 12% | 2.32 |
| TiZrO | $TiZrO_x$ | $2-4*10^{-3}$ mbar | Ar 90%-$O_2$ 10% | 2.32 | at.: by atoms;
wt: weight;
*: at 550 nm.

The materials and the physical thicknesses in nanometers (unless otherwise indicated) of each layer or coating which constitutes the stacks are listed in the table below as a function of their positions with regard to the substrate carrying the stack.

| Glazing | | Comp-1 | Comp-2 | Invention |
|---|---|---|---|---|
| Upper protective layer | $TiZrO_x$ | — | — | 2 |
| | $ZrO_x$ | 2 | — | — |
| | $SiO_x$ | — | 2 | — |
| Antireflective coating | $Si_3N_4$ | 30 | 30 | 30 |
| Blocking layer BO | NiCr | 1 | 1 | 1 |
| Functional layer | Ag | 7 | 7 | 7 |
| Blocking layer BU | NiCr | 1 | 1 | 1 |
| Antireflective coating | $Si_3N_4$ | 30 | 30 | 30 |
| Substrate (mm) | glass | 4 | 4 | 4 |

A heat treatment of tempering type is carried out on the coated substrates at 630° C. for 7 minutes.

The upper protective layer of the glazing according to the invention protects the stack from external attacks and makes possible very good thermal, mechanical and chemical durability, compared with other protective layers, such as layers of zirconium oxide ($ZrO_2$) or silicon oxide ($SiO_2$). The use of this upper protective layer makes possible in particular the use of the stack on face 1, that is to say on the face of the substrate in contact with the chamber of the heating device, such as an oven.

I. Evaluation of the Thermal Resistance

Figure 2:
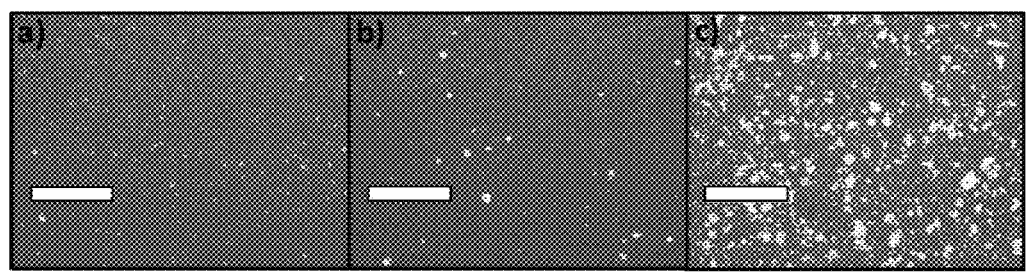

The most important aspect for providing protection of people and also savings in energy is a good resistance of the layer to high temperatures. This is generally not possible with layers comprising silver, which rapidly corrode at high temperatures. In order to simulate the life cycle of stacks of thin layers comprising a silver layer in a pyrolytic self-cleaning oven, the substrate coated with said stack is heated at 400° C. for 500 h. This represents close to 15 years of use in pyrolytic mode at a rate of one pyrolysis cycle of 3 h per month. Micrographs taken at the end of the test of glazings comprising the different protective layers are presented in FIG. 2.

The glazing according to the invention represented in the image (a) with a $TiZrO_x$ upper protective layer exhibits only instances of very slight damage visible with a microscope.

The comparative-2 glazing represented in the image (b) with an $SiO_x$ upper protective layer exhibits instances of damage which are more visible.

The comparative-1 glazing represented in the image (c) with a $ZrO_x$ upper protective layer exhibits instances of obvious damage.

Furthermore, the emissivity of the comparative-1 glazing is increased by 25%, which reduces its effectiveness, whereas the emissivity of the glazing of the invention is unchanging.

II. Evaluation of the Chemical Resistance and of the Resistance to Cleaning

The results of a soiling cycle at high temperatures are presented in the table below. These cycles simulate the constraints which a glazing may encounter, in particular when it is used on the face of the substrate in contact with the chamber of the heating device. The glazing is soiled on the side of the stack with different foodstuffs and cleaning products and then heated at 200° C. for 2 h. The glass is subsequently cleaned with an oven cleaner.

The glazing of the invention comprising a stack with an upper protective layer based on $TiZrO_x$ withstands all the substances tested, whereas the comparative glazings 1 and 2 with $ZrO_2$ or $SiO_2$ protective layers cannot be cleaned in some cases and are irreversibly damaged.

The following assessment indicators were used to record the possible detrimental changes:
"+": No marks visible,
"−": Marks visible.

| | Invention $TiZrO_x$ | Comp-2 $SiO_2$ | Comp-1 $ZrO_2$ |
|---|---|---|---|
| Vinegar | + | + | − |
| Stewed fruit | + | + | − |
| Saline solution | + | − | − |
| Lemon juice | + | + | + |
| Ajax | + | + | + |
| Cillit Bang ® degreasing agent | + | + | + |
| Fat | + | − | + |
| DécapFour ® | + | + | − |
| Fingermarks | + | + | + |

These results show that the stack comprising a silver-based functional layer is sufficiently resistant to cleaning products and to foodstuffs to be able to be positioned on the face of the substrate in contact with the chamber of the heating device.

The invention claimed is:

1. A heating device comprising:
   heating means; and
   a chamber delimited by one or more walls, at least one wall of which comprises at least one glazing comprising a transparent substrate coated with a stack of thin layers, wherein the stack of thin layers comprises:
   only one silver-based functional metal layer,
   a first dielectric coating located below the silver-based functional metal layer and comprising at least one dielectric layer based on silicon and/or aluminum nitride, wherein the first dielectric coating has a thickness of 15 nm to 50 nm,
   a first blocking layer made of metal(s) selected from the group consisting of niobium, tantalum, titanium, chromium, nickel, and alloys of at least two of said metals, wherein the first blocking layer has a thickness of 0.2 nm to 5.0 nm,
   a second blocking layer located above and in contact with the silver-based functional metal layer, wherein the second blocking layer is made of metal(s) selected from the group consisting of niobium, tantalum, titanium, chromium, nickel, and alloys of at least two of said metals and wherein the second blocking layer has a thickness of 0.2 nm to 5.0 nm,
   an uppermost protective layer based on zirconium titanium oxide having an atomic ratio of titanium to zirconium Ti/Zr between 2.0 and 4.0, and
   a second dielectric coating located above the silver-based functional metal layer and located below and in contact with an uppermost protective layer based on zirconium titanium oxide, wherein the second dielectric coating comprises at least one dielectric layer based on silicon and/or aluminum nitride and having a thickness of 20 to 50 nm,
   wherein a total thickness of all oxide layers in the stack is less than 5 nm.

2. The heating device as claimed in claim 1, wherein the uppermost protective layer has a thickness:
   of greater than or equal to 1 nm.

3. The heating device as claimed in claim 1, wherein the atomic ratio of titanium to zirconium Ti/Zr is between 2.5 and 3.5.

4. The heating device as claimed in claim 1, wherein at least one blocking layer is made of an alloy of at least two of niobium, tantalum, titanium, nickel and chromium.

5. The heating device as claimed in claim 1, wherein the first dielectric coating comprises at least one dielectric layer having a stabilizing function based on zinc oxide.

6. The heating device as claimed in claim 1, wherein the stack comprising the silver-based functional layer is positioned on a face of the substrate in contact with the chamber of the heating device.

7. The heating device as claimed in claim 1, wherein the glazing is a multiple glazing comprising two, three or four substrates.

8. The heating device as claimed in claim 1, wherein at least the substrate coated with the stack is bent and/or tempered.

9. The heating device as claimed in claim 1, wherein the first blocking layer is made of an alloy of nickel and chromium.

10. The heating device as claimed in claim 1, wherein the second blocking layer is made of an alloy of nickel and chromium.

11. A method comprising:
using a glazing as a constituent element of a heating device or of a fireproof door, the glazing comprising a transparent substrate coated with a stack of thin layers, wherein the stack of thin layers comprises:
only one silver-based functional metal layer,
a first dielectric coating located below the silver-based functional metal layer and comprising at least one dielectric layer based on silicon and/or aluminum nitride, wherein the first dielectric coating has a thickness of 15 nm to 50 nm,
a first blocking layer made of metal(s) selected from the group consisting of niobium, tantalum, titanium, chromium, nickel, and alloys of at least two of said metals, wherein the first blocking layer has a thickness of 0.2 nm to 5.0 nm,
a second blocking layer located above and in contact with the silver-based functional metal layer, wherein the second blocking layer is made of metal(s) selected from the group consisting of niobium, tantalum, titanium, chromium, nickel, and alloys of at least two of said metals and wherein the second blocking layer has a thickness of 0.2 nm to 5.0 nm,
an uppermost protective layer based on zirconium titanium oxide having an atomic ratio of titanium to zirconium Ti/Zr between 2.0 and 4.0 and
a second dielectric coating located above the silver-based functional metal layer and located below and in contact with an uppermost protective layer based on zirconium titanium oxide, wherein the second dielectric coating comprises at least one dielectric layer based on silicon and/or aluminum nitride and having a thickness of 20 to 50 nm,
wherein a total thickness of all oxide layers in the stack is less than 5 nm.

12. The method as claimed in claim 11, wherein the glazing is chosen from multiple glazings comprising at least two transparent substrates.

13. The method as claimed in claim 11, wherein the atomic ratio of titanium to zirconium Ti/Zr is between 2.5 and 3.5.

14. A heating device comprising:
heating means; and
a chamber delimited by one or more walls, at least one wall of which comprises at least one glazing comprising a transparent substrate coated with a stack of thin layers comprising only one silver-based functional metal layer,
wherein the stack comprises an uppermost protective layer based on zirconium titanium oxide having an atomic ratio of titanium to zirconium Ti/Zr between 2.0 and 4.0 and a thickness of less than or equal to 15 nm, and a dielectric layer based on silicon and/or aluminum nitride located below and in contact with the uppermost protective layer based on zirconium titanium oxide and
wherein the stack comprising the silver-based functional layer is positioned on a face of the substrate in contact with the chamber of the heating device.

15. The heating device as claimed in claim 14, wherein the at least one glazing is a multiple glazing comprising at least two transparent substrates, each substrate having a face toward the inside of the heating device and a face toward the outside of the heating device, and wherein the stack comprising the silver-based functional layer is positioned on the faces of the at least two substrates toward the inside of the heating device.

16. The heating device as claimed in claim 14, wherein the at least one glazing is a multiple glazing comprising at least two transparent substrates, each substrate having a face toward the inside of the heating device and a face toward the outside of the heating device, wherein the stack comprising the silver-based functional layer is positioned on the face of at least one substrate toward the outside of the heating device.

* * * * *